United States Patent
Chaiken et al.

(10) Patent No.: US 10,985,591 B2
(45) Date of Patent: Apr. 20, 2021

(54) SYSTEM AND METHOD TO IMPROVE BATTERY PERFORMANCE WITH CYCLED CURRENT TRANSFER

(71) Applicant: Dell Products L.P., Round Rock, TX (US)

(72) Inventors: Craig L. Chaiken, Pflugerville, TX (US); Terry L. Matula, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 392 days.

(21) Appl. No.: 15/924,849

(22) Filed: Mar. 19, 2018

(65) Prior Publication Data

US 2019/0288538 A1    Sep. 19, 2019

(51) Int. Cl.
*H02J 7/00* (2006.01)
*H01M 10/44* (2006.01)

(52) U.S. Cl.
CPC ......... *H02J 7/0085* (2013.01); *H01M 10/441* (2013.01); *H02J 7/0049* (2020.01)

(58) Field of Classification Search
USPC ................................................. 320/125, 126
See application file for complete search history.

(56) References Cited

U.S. PATENT DOCUMENTS

| | | | |
|---|---|---|---|
| 5,640,078 A | 6/1997 | Kou et al. | |
| 5,874,823 A * | 2/1999 | Suzuki | H02J 7/0014 320/125 |
| 5,955,867 A * | 9/1999 | Cummings | H02J 7/00 320/107 |
| 5,963,010 A * | 10/1999 | Hayashi | H01M 10/4257 320/106 |
| 6,100,670 A * | 8/2000 | Levesque | H02J 7/00 320/150 |
| 6,239,579 B1 * | 5/2001 | Dunn | H02J 7/0019 320/121 |
| 6,724,588 B1 * | 4/2004 | Cummings | G06F 1/263 361/18 |
| 7,133,703 B2 * | 11/2006 | Aoshima | G01R 31/367 455/574 |
| 7,501,720 B2 * | 3/2009 | Popescu-Stanesti | H02J 7/0018 307/66 |
| 8,803,479 B2 * | 8/2014 | Kim | H01M 10/4207 320/126 |
| 9,007,024 B2 * | 4/2015 | Li | H02J 7/0013 320/124 |
| 9,760,138 B2 | 9/2017 | Huang et al. | |
| 2004/0160213 A1 | 8/2004 | Stanesti et al. | |
| 2010/0250038 A1 * | 9/2010 | Morita | G01R 31/389 701/22 |

(Continued)

*Primary Examiner* — Samuel Berhanu
(74) *Attorney, Agent, or Firm* — Zagorin Cave LLP; Robert W. Holland (57) ABSTRACT

A battery includes plural battery cells that output a source voltage to power a device, such as an information handling system. A controller of the battery disconnects each battery cell at a predetermined interval for a predetermined time period, such as from a range of between 15 and 60 seconds, while maintaining the source voltage. The predetermined time and interval are selected based upon the load supplied by the battery and an estimated increase in battery output efficiency.

20 Claims, 5 Drawing Sheets

(56) References Cited

U.S. PATENT DOCUMENTS

| | | | | |
|---|---|---|---|---|
| 2011/0260689 | A1* | 10/2011 | Kano | H02J 7/0026 |
| | | | | 320/128 |
| 2012/0081077 | A1* | 4/2012 | Sasaki | H01M 10/482 |
| | | | | 320/134 |
| 2012/0187887 | A1* | 7/2012 | Sone | H02M 1/10 |
| | | | | 318/504 |
| 2014/0377594 | A1* | 12/2014 | Suzuki | H01M 2/34 |
| | | | | 429/7 |
| 2016/0380315 | A1* | 12/2016 | Weicker | H02J 7/34 |
| | | | | 320/136 |

* cited by examiner

SYSTEM AND METHOD TO IMPROVE BATTERY PERFORMANCE WITH CYCLED CURRENT TRANSFER

BACKGROUND OF THE INVENTION

Field of the Invention

The present invention relates in general to the field of information handling system battery power sources, and more particularly to a system and method to improve battery performance with cycled current transfer.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems process information with processing components that cooperate to execute instructions. Generally, processing components perform processing functions by consuming direct current electrical power. Often power consumption varies widely based upon the type and duration of processing functions. For example, a typical central processing unit may rapidly increase and decrease current draw based upon the number of instructions it executes in a time frame.

Typically information handling systems include a power supply that generates adequate direct current to manage processing functions at a maximum level for at least a limited time duration. Power supplies generally include circuitry and capacitance that, in effect, buffers current to meet power consumption surges. A typical information handling system power supply accepts alternating current from an external power source and converts the alternating current to a direct current supply voltage. Within the information handling system a number of power rails will supply specific components with voltages defined for the components.

Portable information handling systems generally have an external alternating current power source that converts alternating current to direct current and provides the direct current through a cable to the information handling system power supply. Portable information handling systems typically integrate a battery power source that charges from the external power source and discharges to power processing components when the external power source is not available.

Battery life is typically managed with some care in an information handling system so that an end user can operate the information handling system without an external power source for an extended time period. For example, information handling systems often implement automated power saving steps to reduce battery current draw, such as dimming a display, throttling a processor and sleeping processing components and functions that are not in active use.

Generally batteries store and discharge current with a common structure that conducts electrons between an anode and cathode through an electrolyte. The electrolyte promotes movement of ions from the cathode to the anode on charge and from the anode to the cathode on discharge. Ions are electrically charged atoms that have lost or gained electrons. Typical electrolytes include soluble salts, acids, bases, polymers and ceramics, and may have liquid, gel and dry compositions. Typical information handling system batteries use a lithium ion composition and include a number of different types of electrolytes and additives that support lithium ions carrying current within the battery during discharge from the negative to the positive electrode.

Generally as a battery discharges over time the voltage available from the battery drops. Typically an information handling system monitors battery voltage to shut off the battery before damage occurs to the battery. Often, lithium ion based batteries include battery management systems that monitor battery voltage and current to manage battery charge, discharge and operating conditions. For example, information handling systems typically include an embedded controller that interfaces with a "smart" battery system to obtain real time battery operational parameters. Based upon reported battery conditions, information handling systems manage power consumption and report battery life to the end user, eventually shutting down as battery voltage and/or available current drops below a minimum level.

SUMMARY OF THE INVENTION

Therefore, a need has arisen for a system and method which improves battery performance with cycled current transfer.

In accordance with the present invention, a system and method are provided which substantially reduce the disadvantages and problems associated with previous methods and systems for managing battery charge life. Plural battery cells of a battery are disconnected from discharge to a device, such as an information handling system, at predetermined intervals for a predetermined time, such as a time that improves battery discharge efficiency.

More specifically, an information handling system processes information with a processor and memory powered by a battery having plural battery cells. In a power save mode, a controller associated with the battery selectively disconnects each battery cell for a predetermined time and at a predetermined interval so that the battery cell provides power with improved efficiency, such as due to reduced resistance associated with transfer of current through the battery cell electrolyte to the battery cell cathode. In one example embodiment, the controller selects a full power mode having all battery cells connected and the power save mode based upon the device load drawn from the battery. In an alternative embodiment, an operating system or other logic executing on the information handling system commands the controller to provide power in the full power mode or the power save mode. For example, an operating system transition to a low power state initiates the power save mode and an operating system transition from the low power state initiates the full power mode. The battery power save mode disconnect time and interval may be selected bases upon estimated or measure battery characteristics, such as resistance at the battery cell cathode.

The present invention provides a number of important technical advantages. One example of an important technical advantage is that an information handling system battery provides more efficient power transfer by managing battery cell characteristics, such as resistance at the battery cell cathode. Cycling of current from different battery cells allows each battery cell to rest in turn and thus recover discharge efficiency, while the connected battery cells maintain the expected battery source voltage output. In periods of low system load, battery efficiency diminishes at a slower rate allowing power save mode to fully support system operations. As system load increases, battery cell rest intervals may increase to meet system demand while still providing improved discharge efficiency. In the event of heavy system load, the battery shifts to a full power mode with all battery cells connected. Battery cell rest times of between 15 and 60 seconds can provide 10% higher output voltages due to improved battery efficiency without impacting service of the battery to the information handling system load.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system powers processing components from a battery that selectively disconnects battery cells at an interval and for a time that promotes battery discharge efficiency. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
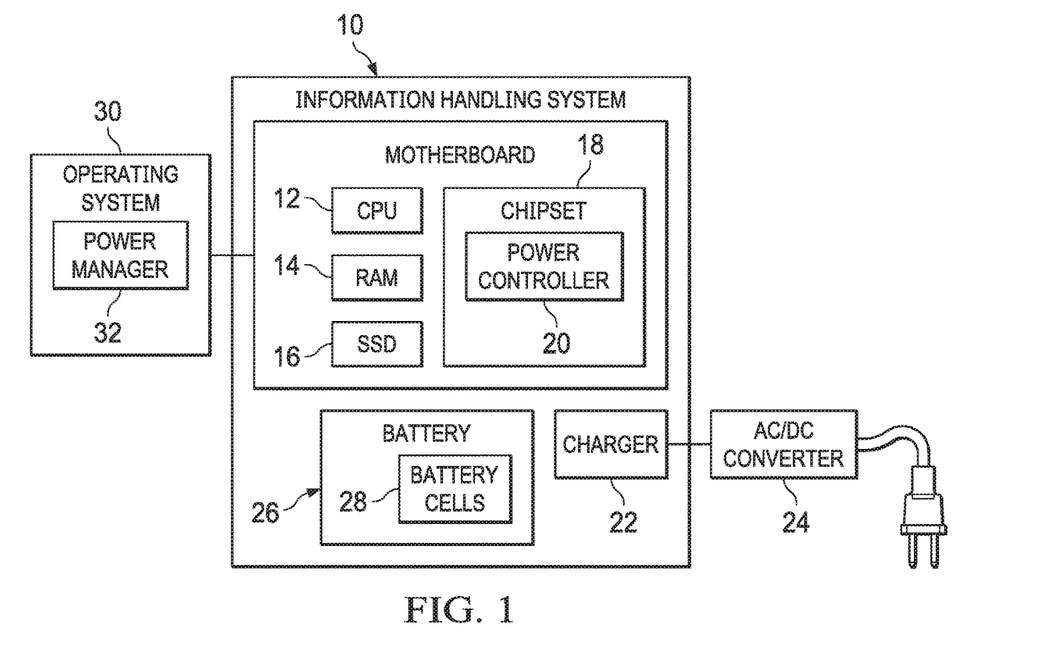
FIG. 1 depicts a block diagram of an information handling system having an integrated battery with battery cell current cycling.

Referring now to FIG. 1, a block diagram depicts an information handling system 10 having an integrated battery 26 with battery cell 28 current cycling. In the example embodiment, information handling system 10 processes information with instructions executed by a central processing unit (CPU) 12 and stored in a random access memory (RAM) 14. For instance, a solid state drive (SSD) 16 or other persistent storage devices stores an operating system 30 and applications that CPU 12 retrieves to RAM 14 for execution. A chipset 18 includes a variety of processing components and persistent memory elements that coordinate interactions between CPU 12 and peripheral devices, such as a display, keyboard, mouse and external power source AC/DC converter 24. For example, a power controller included in chipset 18 interfaces with a charger 22 to manage power for use by CPU 12 and other processing components. Charger 22 accepts external power from AC/DC converter 24 and applies the external power to run information handling system 10 and charge an integrated battery 26. When AC/DC converter 24 is disconnected, charger 22 receives power from battery 26 to run information handling system 26. Power controller 20 manages charger 22 and adapts power provided from charger 22 to voltages and currents needed by electrical components of information handling system 10. As an example, AC/DC converter 24 receives alternating current from a wall socket and provides approximately 19.5V of direct current to charger 22. Battery 26 includes at least five lithium ion battery cells 28 each with a native voltage that varies based on charge around a nominal 3.7V of direct current and that are interfaced in series to provide a nominal output of approximately 18.5V direct current. Power controller 20 and charger include circuits and power rails that feed regulated direct current voltage to processing components at sufficient currents to run the processing components.

During normal operations, the load created by running processing components of information handling system 10 can vary significantly based upon how the system is used. As an example, CPU 12 can rapidly swing between using virtually no current when processing tasks are idle to very high current loads when complex processing tasks are in use. Operating system 30 includes a power manager 32 that manages power consumption on a system basis. Power manager 32 may use a variety of tools that save power when information handling system 10 runs on battery 26. For example, power manger 32 monitors end user presence, such as with a timer that tracks time since an end user input, and initiates a sleep state during nonuse, such as an ACPI S3 sleep. As another example, power manger 32 may sleep specific components when not in use and throttle other components during times of minimal use. For instance, power manager 32 may reduce power consumption as battery charge drops so that an end user can extend a usage cycle before the system has to shut down due to lack of power when the battery fully discharges.

In the example embodiment, power manager 32 interfaces with battery 26 to select discharge in a full power mode or a power save mode. Full power mode discharge of battery 26 includes a simultaneous discharge from all battery cells 28. Power save mode discharge cycles between battery cells 28 by selectively disconnecting and reconnecting battery cells 28 to promote more efficient current flow while maintaining the same battery source voltage as the full power mode discharge. When a battery cell 28 discharges for an extended time period, chemical reactions at the battery electrolyte result in increased resistance at the battery cathode. As is set forth in greater detail below, one example is the formation of hydrogen bubbles at a nickel cadmium battery during discharge, which decreases voltage output from the battery. Periodic disconnect or removal of load from a battery allows the hydrogen bubbles to dissipate, thus reducing resistance at the battery cathode. When power manager 32 determines that information handling system 10 is operating with reduced current consumption, such as during idle periods or sleep, power manger 32 commands battery 26 to enter a power save mode that removes the load from each battery cell at a periodic interval for a defined rest time so that the battery cathode reverts to a reduced resistance that promotes more efficient power transfer. Current cycling that disconnects a battery for 15 to 60 seconds of rest time provides this improved efficiency. Disconnect of battery cells 28 at a similar 15 to 60 interval allows current to transfer with reduced resistance as chemical changes at the cathode take place and then switches to a different battery cell 28 that has rested to continue current draw in an efficient manner.

Figure 2:
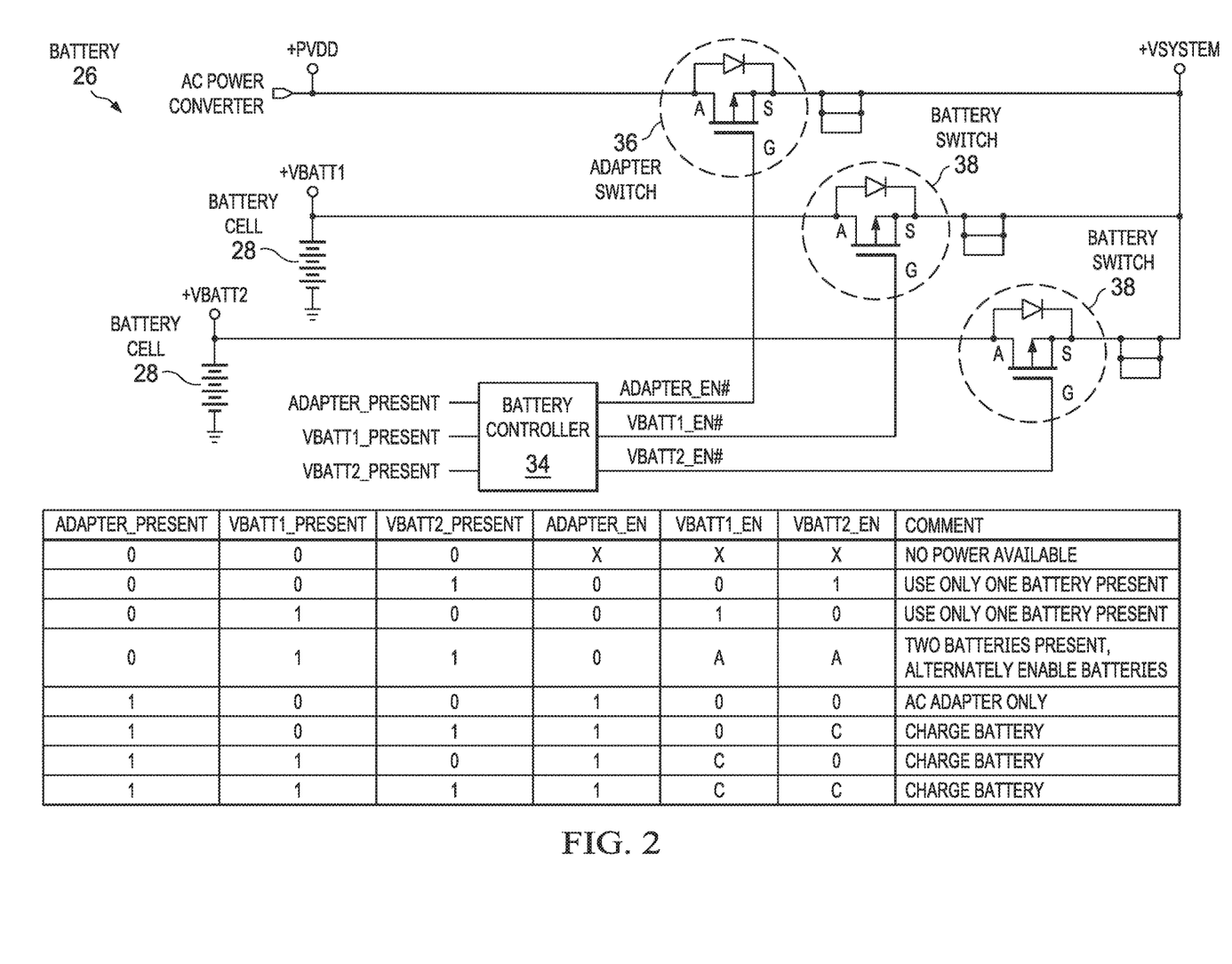
FIG. 2 depicts a circuit block diagram of battery cells configured to selectively connect and disconnect for predetermined times and intervals.

Referring now to FIG. 2, a circuit block diagram depicts battery cells 28 configured to selectively connect and disconnect for predetermined times and intervals. In the example embodiment, a battery controller 34 interfaces with an adapter switch 36 and a battery switch 38 for each battery cell 28. Battery controller 34 opens adapter switch 36 to disconnect external power from charging battery cells 28 and closes adapter switch 36 to connect external power to charge battery cells 28. Battery controller 34 opens battery switches 38 to disconnect charge and discharge of the associated battery cell 28 and closes battery switches 38 to connect charge and discharge of the associated battery cell 28. In the example embodiment, charging of battery cells 28 is supported in a conventional manner with battery switches 38 closed to connect all battery cells simultaneously. In alternative embodiments, current cycling during charge may be used in a manner similar to discharge as set forth below. During discharge, battery controller 34 controls battery switches 38 to connect and disconnect battery cells 28 at predetermined intervals and for predetermined times. During disconnect, battery cell 28 recovers from electrolyte inefficiencies, such as by dissipating hydrogen bubbles formed on the battery cell cathode, so that on reconnect battery cell 28 transfers current with improved efficiency. Battery controller 34, for instance, determines a disconnect time and interval or, alternatively, receives a disconnect time and interval from operating system power manager 32, and cycles through disconnects with an internal timer. In one example embodiment, the interval between disconnects and the time to remain disconnected are set at the same value, such as in a range between 15 and 60 seconds. In alternative embodiments, the interval between disconnects is determined by analyzing system load and the number of battery cells 28 within battery 26. For example, when current draw is high then less frequent battery cell disconnects keeps more battery cells interfaced with the output and providing current to meet system load. The disconnect time may vary based on the interval, such as by having a longer disconnect time with a longer interval between disconnects so that dissipation of electrolyte inefficiencies takes place, or may vary based on other factors, such as temperature, charge state, battery age, etc.

Figure 3:
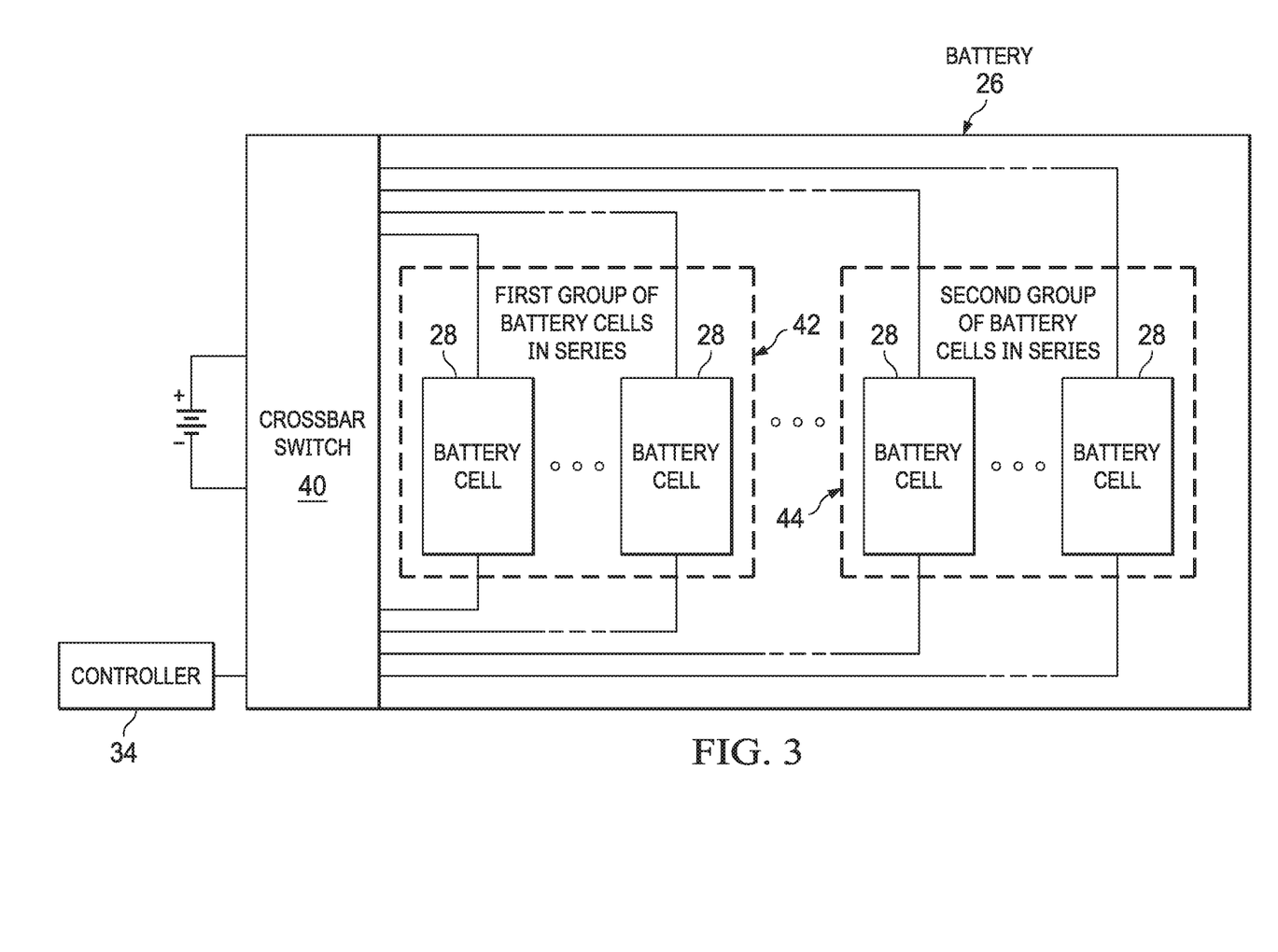
FIG. 3 depicts a block diagram of a battery having plural cells configured to interconnect through a crossbar switch that supports battery cell disconnect for a predetermined time and predetermined interval.

Referring now to FIG. 3, a block diagram depicts a battery having plural cells configured to interconnect through a crossbar switch 40 that supports battery cell 28 disconnect for a predetermined time and predetermined interval. Crossbar switch 40 is managed by controller 34 to selectively interface battery positive and negative outputs in a serial or parallel configuration. A typical lithium ion battery 26 includes three or more lithium ion cells 28 connected in series so that the group of battery cells 26 output a desired direct current voltage. For example, three lithium ion battery cells 28 in series, each having a nominal voltage of 3.7V output a source voltage of 11.1V. In fact, the nominal voltage changes based upon charge state where a typical lithium ion battery with a full charge may have 4.1V and a discharged lithium ion battery may drop to below 3V. A typical lithium ion battery 26 also includes multiple groups of battery cells 28 connected in parallel, which increases the current available from the battery cells. In the example embodiment, a first group 42 of battery cells 28 and a second group 44 of battery cells 44 are each connected in series so that each group provides a source voltage equal to the number of battery cells 28 times the nominal voltage of each battery cell 28. In addition, first group 42 and second group 44 are connected in series so that at the same source voltage, current is available from each group of battery cells. During a full power mode, battery 26 connects all battery cells 28 to one of groups 42 or 44 so that the information handling system load may be serviced at the source voltage with current from all available battery cells 28.

Crossbar switch 40 selectively configures battery cells 28 in a power save mode that provides a disconnect time for battery cells 28 to recover efficient discharge. Controller 34 manages a disconnect interval and disconnect time at battery cells 28 when in the power save mode by selectively reconfiguring interconnection of battery cells 28 through crossbar switch 40. Power save mode may be initiated from an operating system or may be initiated by controller 34 based upon current drawn from battery 26. For example, controller 34 may automatically initiate power save mode if current draw drops below a threshold and revert to full power mode if current draw increases over a threshold. The number of battery cells 28 connected to discharge may also depend upon current drawn from battery 26. For example, during periods of higher current draw, full power mode discharges from all battery cells simultaneously without disconnecting of battery cells 28. As current draw drops, power save mode is commanded with the number of disconnected "resting" battery cells incrementally increasing. For instance, when current draw drops to a first threshold, on battery cell 28 rests at a time (one battery). At a next decreased current threshold, two battery cells 28 rest at a time. At a minimum incremental current draw threshold, only enough battery cells 28 remained connected in series to maintain the battery 26 source voltage, with the other battery cells 28 resting. Although FIG. 3 depicts a crossbar switch 40 controlled by controller 34, in alternative embodiments, other types of switches or interconnects may be used to selectively configure battery cells 28.

As an example, a battery with eight battery cells 28 has battery cells 1-4 in a first group 42 interfaced in series for a nominal source voltage output of 14.1VDC and battery cells 5-8 in a second group 44 also in series for the same source voltage output. In full power mode, group 42 and 44 interface in parallel to output the source voltage. In power save mode, crossbar switch 40 provides a number of different configurations that rest different numbers of battery cells 28 for different time periods and at different periodic intervals. A lowest current draw power save mode disconnects and reconnects each of group 42 and 44 in turn. For example, group 42 disconnects from the parallel interface for one minute while group 44 powers information handling system 10. After the one minute rest, group 42 connects to provide current and group 44 disconnects to rest for one minute. In this example, the disconnect time and disconnect interval are equal. As an alternative example, four groups of parallel battery cells 28 are interfaced in series so that different numbers of individual battery cells 28 may be disconnected at a time. For example, battery cells 1 and 5; 2 and 6; 3 and 7; and 4 and 8 each interface with each other in parallel to form four groups that, in turn, interface in series to output the nominal 14.1VDC source voltage. At a 15 second interval, a battery cell is disconnected and another battery cell is reconnected, and each disconnect time lasts for 60 seconds. Thus, battery cell 1 connects to provide current as battery cell 5 disconnects to rest so that the output from the parallel battery connection has the same source voltage. After an interval of 15 seconds, battery cell 2 connects and battery cell 5 disconnects, etc. . . . . If current draw increases from battery 26, additional current may be provided by decreasing the rest time to 30 seconds so that, essentially, only two battery cells 28 are disconnected at a time. Controller 34 thus has granular control of the number of battery cells 28 that are connected or resting at any point in time by adjusting the interval at which the disconnect and reconnect cycle takes place and by adjusting the rest time provided to each battery cell 28.

In one embodiment, battery efficiency is managed by observing battery performance and adapting disconnect intervals and rest times to optimize battery performance. For example, sensors associated with each battery cell 28 allow an estimate of resistance at the battery cathode by measuring, for example, voltage drop from the electrolyte across the cathode. Sensor data may be applied locally by controller 34 or forwarded to power manager 32 so that optimal disconnect intervals and rest times may be determined for different operating conditions. For example, voltage drop associated with each battery cell 28 after a reconnect provides some indication of resistance change at the battery cell cathode. In one example embodiment, a drop in voltage output at a battery cell of approximately 50 mV provides an indication that additional battery efficiency may be gained with a disconnect and rest of the battery cell. In another example embodiment, to dynamically select an optimal rest time, a comparison logic compares voltage increase at a battery on subsequent reconnects after each rest to select the shortest rest time with the highest voltage increase after the battery first reconnects. A logic loop of the battery controller measures the voltage increase immediately after swapping to a battery that was in a rest state. The controller increases the time in rest if the next voltage increase for that battery is less than the last voltage increase, which indicates that the delay was not adequate. If the voltage increase is greater than the previous connect for that battery, the previous rest time was too short and the current rest time could still be low. If the voltage increase is the same, then the rest time may be shorten to see the impact on voltage at the next reconnect, since the rest time could be too long. Incremental changes in rest time provide feedback for different conditions until an optimal rest time is found.

Figure 4:
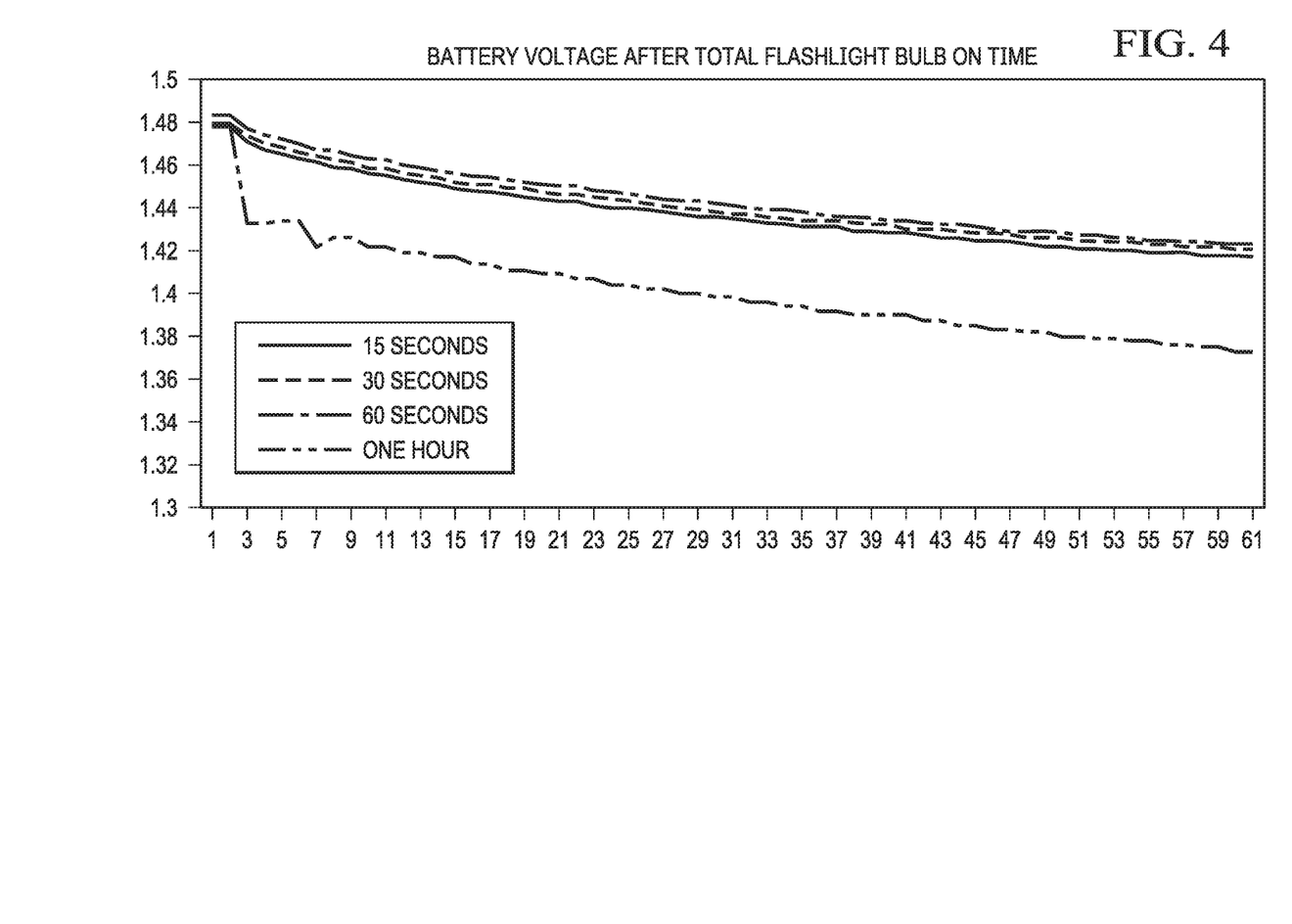
FIG. 4 depicts a graph of battery voltage over time with different disconnect intervals and times.

Referring now to FIG. 4, a graph depicts battery voltage over time with different disconnect intervals and times. In the example, four nickel cadmium batteries discharged with a flashlight were compared when run for an hour without disconnect, and when run for 60, 30 and 15 second disconnect/rest intervals and times. As is evident from the battery that ran without disconnect and rest, a 100 mV drop in voltage output occurs after about a minute due to hydrogen gas bubbles formed on the battery cathode and the resulting increase in resistance. In contrast, batteries that disconnected and rested had improved source voltage output as the hydrogen bubbles dissipated during the rest time, improving cathode resistance. The graph illustrates improved efficiency for battery output that translates to other battery chemistries.

Figure 5:
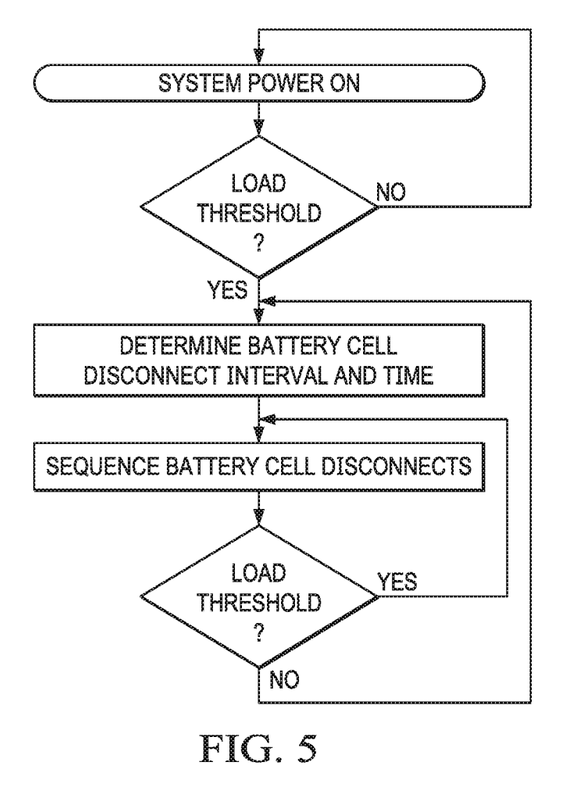
FIG. 5 depicts a flow diagram of a process for selecting a power save battery mode that periodically disconnects battery cells and a full power battery mode.

Referring now to FIG. 5, a flow diagram depicts a process for selecting a power save battery mode that periodically disconnects battery cells and a full power battery mode. The process starts at step 46 with system power on having the battery default to a full power mode. At step 48, a determination is made of whether a load threshold is reached that allows for transition to a power save battery mode. If not, the process returns to step 46. Once the load threshold is met, the process continues to step 50 to determine the battery cell disconnect interval and time. In some instances the disconnect interval and time may be set by an operating system of the information handling system. For example, if the operating system is transitioning to an S3 sleep mode, it may command a power save mode with the smallest number of battery cells connected. In other instances, the disconnect interval and time may be set by the battery itself based upon load placed on the battery by the information handling system. For example, selecting different disconnects intervals and times for each battery cell allows the battery to effectively self-regulate its maximum current output while increasing battery efficiency as much as current draw allows. Once the battery has a disconnect interval and time, the process continues to step 52 to sequence through the battery cell disconnects at the disconnect interval with each battery cell disconnected for the disconnect time. As described above, disconnect times may vary as needed to meet system load, however, disconnect times in the range of 15 to 60 seconds tend to provide sufficient rest to increase battery cell voltage output. A disconnect interval may be spaced out between the battery cells to maintain the same number of battery cells connected at a time. For example, the disconnect interval may equal the disconnect time with each battery cell disconnected individually. For instance, a disconnect and reconnect may take place for one battery cell set every 15 seconds and be staggered across multiple battery cells with each battery cell disconnected for 30 seconds. At step 54, a determination is made of whether the load on the battery has changed. If not, the process returns to step 52 to continue with the same disconnect interval and time. If the load has changed, the process returns to step 50 to determine an updated battery disconnect time and interval, including whether to return to full power mode.

Although the present invention has been described in detail, it should be understood that various changes, substitutions and alterations can be made hereto without departing from the spirit and scope of the invention as defined by the appended claims.

What is claimed is:
1. An information handling system comprising:
a processor operable to execute instructions that process information;
a memory interfaced with the processor and operable to store the instructions and information;
a power controller interfaced with the processor and memory and operable to accept power from a power source at a source current and voltage and to provide an operating current and voltage to the processor and the memory;
a battery system interfaced with the power controller, the battery system having plural battery cells configured to provide power to the power controller at the source current and voltage; and
a battery controller interfaced with the power controller and the plural cells, the battery controller having a power saving mode in which the battery controller selectively periodically disconnects each of the plural cells at a predetermined interval for a predetermined time period while the connected battery cells maintain the source voltage, each battery cell disabled from charge and discharge during the disconnects.

2. The information handling system of claim 1 further comprising:
an operating system executing on the processor and interfaced with the power controller;
wherein the operating system selectively enables and disables the power saving mode, the battery controller simultaneously connecting all of the plural cells when the power saving mode is disabled.

3. The information handling system of claim 1 wherein predetermined interval and time period are equal to each other and wherein one-half of the battery cells are disconnected during each interval.

4. The information handling system of claim 3 wherein the predetermined interval and time period fall within a range of 15 to 60 seconds.

5. The information handling system of claim 3 wherein the battery controller cycles one battery cell off at a time.

6. The information handling system of claim 5 wherein the battery controller cycles one battery cell on at a time.

7. The information handling system of claim 1 wherein the predetermined interval and predetermined time are set based upon the amount of the operating current.

8. The information handling system of claim 7 wherein the operating system determines the predetermined interval and predetermined time based upon one or more predetermined conditions and communicates the predetermined time and predetermined interval to the battery controller.

9. The system of claim 8 wherein the predetermined conditions comprise anticipated load on the battery to power the processing components.

10. A method for powering an information handling system from a battery having plural battery cells, the method comprising:
powering information handling system components with the battery at a source voltage, the power provided simultaneously by all of the plural battery cells;
commanding a power save mode at the battery; and
in the power saving mode selectively periodically disconnecting each of the plural battery cells at a predetermined interval for a predetermined time period while the connected battery cells maintain the source voltage, each of the plural battery cells disabled from receiving and discharging power when disconnected.

11. The method of claim 10 further comprising:
disconnecting only one of the plural battery cells at a time; and
spacing the disconnecting evenly.

12. The method of claim 11 further comprising:
disconnecting one set of serially-interfaced battery cells at a time; and
reconnecting each disconnected set of serially-interfaced battery cells before disconnecting a next set of serially-interfaced battery cells.

13. The method of claim 10 further comprising:
reconnecting each of the plural battery cells after the predetermined time;
monitoring a voltage drop across each of the plural battery cells following the reconnecting; and
setting the predetermined interval based upon the voltage drop.

14. The method of claim 10 further comprising:
estimating a resistance associated with each of the plural battery cell's cathode; and
applying the estimated resistance to set the predetermined interval and predetermined time period.

15. The method of claim 10 wherein commanding a power save mode further comprises:
detecting at the battery current draw from the battery of less than a threshold; and
in response to the detecting, commanding the power save mode with a controller of the battery.

16. The method of claim 10 wherein commanding a power save mode further comprises:
detecting with the operating system a predetermined condition associated with a transition to a low power consumption state; and
commanding the power save mode as part of the transition to the low power consumption state.

17. A battery comprising:
plural battery cells, each battery cell providing current at a native voltage;
an output port interfaced with the plural battery cells and outputting a source voltage generated by the plural battery cells from the native voltage;
plural switches interfaced with the plural battery cells, each of the plural switches operable to disconnect current into and out from at least one of the plural battery cells to prevent charge and discharge at the at least one of the plural battery cells when disconnected; and
a battery controller interfaced with the plural switches and operable to command the battery to discharge at a full power mode or a power save mode, the full power mode discharging simultaneously from all of the plural battery cells, in the power save mode selectively periodically shutting down each of the plural battery cells at a predetermined interval for a predetermined time while the connected battery cells maintain the source voltage.

18. The battery of claim 17 wherein the predetermined time is selected from a range of between 15 and 60 seconds.

19. The battery of claim 17 wherein:
the plural battery cells are configured in first and second groups, the first and second groups each interfacing battery cells of the group in series; and
the power save mode disconnects the plural battery cells as groups.

20. The battery of claim 19 wherein each battery cell comprises a lithium ion battery cell.

* * * * *